United States Patent [19]  
Flowers

[11] 4,215,174  
[45] Jul. 29, 1980

[54] INSULATING COATING FOR TRANSFORMER WIRES
[75] Inventor: Ralph G. Flowers, Pittsfield, Mass.
[73] Assignee: General Electric Company
[21] Appl. No.: 889,889
[22] Filed: Mar. 24, 1978
[51] Int. Cl.² ............................................. B32B 15/02
[52] U.S. Cl. ................................... 428/375; 427/116; 427/117; 427/120; 427/379; 428/379; 174/120 SR; 525/187
[58] Field of Search ................ 260/831; 174/120 SR; 427/116; 428/379, 375

[56] References Cited  
U.S. PATENT DOCUMENTS

Re. 25,625  7/1964  Been ...................................... 260/831
3,239,598  3/1966  Olson et al. .......................... 427/116

Primary Examiner—George F. Lesmes
Assistant Examiner—E. Rollins Buffalow
Attorney, Agent, or Firm—Francis X. Doyle; Richard A. Menelly

[57] ABSTRACT

Improved three component insulating coatings for both wet solvent and dry electrostatic application to transformer wires contain an increased epoxy resin concentration and a decreased amount of polyvinyl acetal and phenol aldehyde resins. The increased epoxy content gives substantially improved coatings with no adverse dissipation and hydrolytic effects. The epoxy constituent can range from 30–60 percent by weight providing the ratio of the polyvinyl acetal to phenol aldehyde is kept within the range of from 1 to 1 to 2 to 1.

5 Claims, 5 Drawing Figures

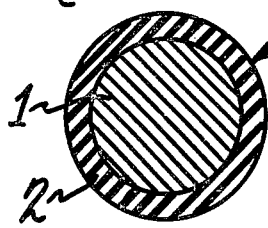
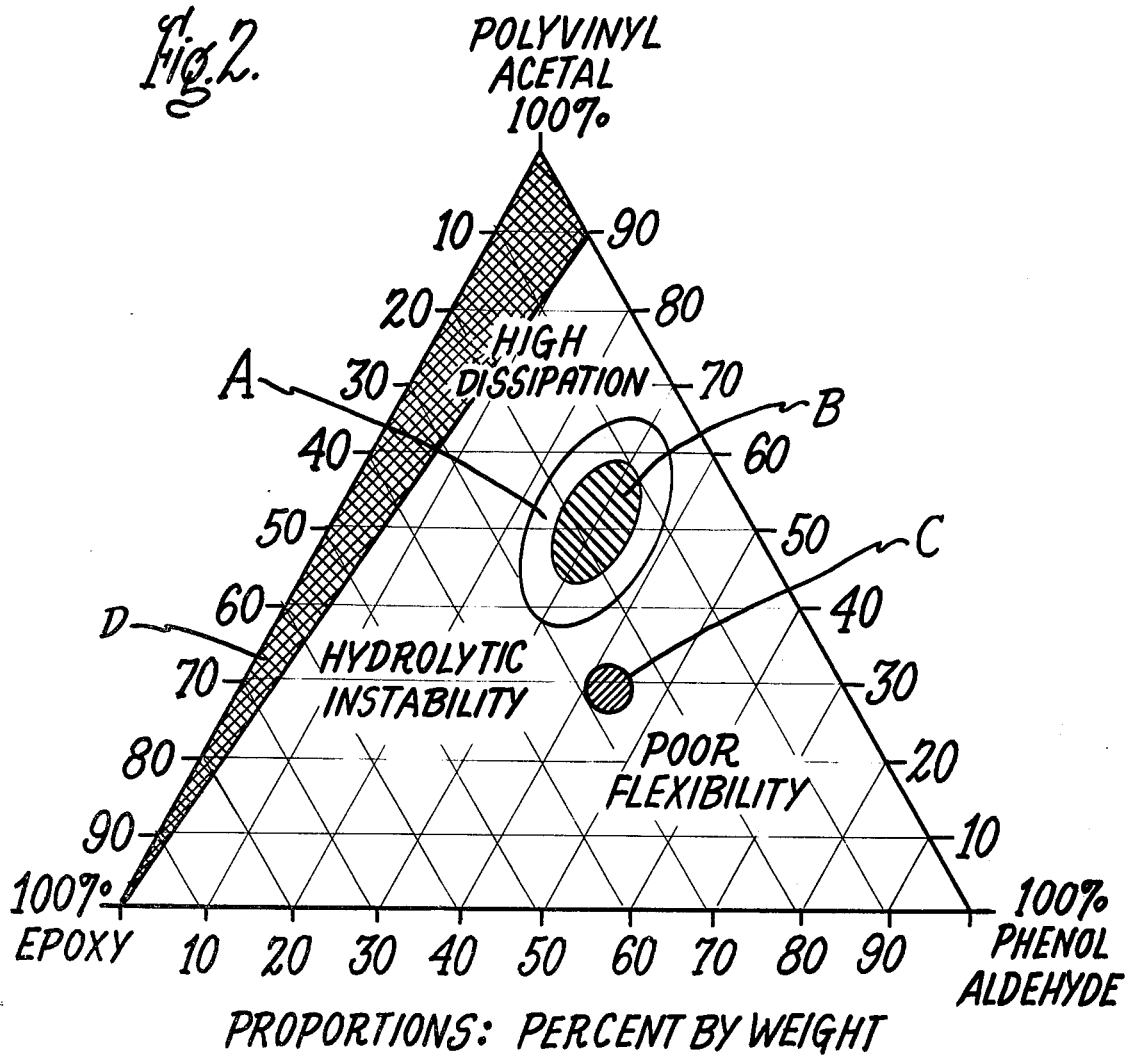

INSULATING COATING FOR TRANSFORMER WIRES

BACKGROUND OF THE INVENTION

This invention relates to enameling compositions used as an insulating coating material for transformer wire. One of the problems involved with current methods and materials used in manufacturing and applying transformer wire coatings is the need for a suitable solvent for dissolving the coating constituents and providing a low viscosity solution. Since the solvents currently utilize expensive hydrocarbon and cresols, other materials are continuously being evaluated in an attempt to reduce the quantity of solvents employed. Over the past 15 years for example, an insulating coating composition consisting of a mixture of polyvinyl acetal and phenolic were reduced in solvent content from 85 weight percent down to 75 percent. This reduction was realized by variations in the polyvinyl acetal and phenolic materials as well as a selected combination of hydrocarbon and cresol solvents. Besides the expense involved in utilizing liquid solvents in the wire coating industry, requirements are now being made by the Environmental Protection Agency to reduce solvent usage by a substantial amount in order to reduce the overall concentration of solvents existing in the atmosphere.

U.S. Pat. application Ser. No. 595,034 filed July 11, 1975, now abandoned, discloses a three component wire insulating composition which includes an epoxy resin in combination with polyvinyl acetal and phenolic resins. The three component composition further reduced the solvent content down to 70 weight percent by taking advantage of the good filmforming properties of the epoxy resin. The use of an epoxy wire coating per se has not heretofore proven feasible due to the poor hydrolytic stability existing with known epoxy compounds. When transformer wires are coated for electrical insulating purposes, and are subjected to long exposure times in the presence of heat and moisture, it is essential that the coating remain electrically stable. Hydrolytic stability therefore is an important parameter for evaluating efficient transformer wire insulating materials. In order to determine hydrolytic stability, the transformer wire coatings are subjected to moisture and temperature for a prescribed period of time and are subsequently measured to determine whether the electrical insulating properties have deteriorated. Wires coated with epoxy compounds per se become hydrolytically unstable and are infeasible for long term transformer wire coatings.

Another requirement for transformer wire coating materials is a low dissipation factor. Since the electrical properties of the coating depend to a large extent upon the transformer operating temperature, the wire coating materials must be able to withstand the high temperatures involved, under short circuit load conditions. In order for the transformer wire coating to be electrically and thermally stable, the dissipation factor, which is a fairly good indication of the ability of the coating to dissipate heat, must be determined at various operating temperatures. If the transformer wire coating has too high a dissipation factor, thermal runaway can occur causing insulation to decrease to an inoperable value.

Formulations intended for use as insulating coatings must be carefully evaluated for temperature, moisture and overall electrical stability for long periods of time in order to ensure that short circuits do not occur due to electrical insulation failure. The polyvinyl acetal and phenolic composition disclosed within the aforementioned U.S. Patent application contains approximately phenolic resin in a ratio of one part to two parts polyvinyl acetal. Attempts to increase the polyvinyl acetal concentration resulted in wire coatings having too high a dissipation factor along with hydrolytic instability. Attempts on the other hand to increase the phenolic content seriously interfered with the flexibility of the coating. As described earlier, various epoxy resin compositions provided good flexible and pin hole free insulating coatings but were hydrolytically unstable and unsuitable per se as wire coatings. Attempts to combine epoxy resins, phenolic resins, and polyvinyl acetal such as suggested within U.S. Pat. No. Re 25,625 have not proven successful when evaluated for transformer wire coatings. Coatings prepared from the aforementioned re-issued patent disclosure were too inflexible to withstand the transformer winding operation. Wire coatings prepared from the adhesive composition disclosed within U.S. Pat. No. 3,239,598 resulted in wire coatings having an excessive dissipation factor and poor flexibility.

The three component coating composition disclosed within aforementioned U.S. Patent application Ser. No. 595,034 resulted in wire coatings having good flexibility, low dissipation factor and hydrolytic stability. The addition of epoxy resin to the polyvinyl acetal and phenolic resins substantially improved the flow properties of the coating during the coating process. With ratios of polyvinyl acetal to phenolic from about 2 to 1, additions of about 11 to 25% epoxy resin can be employed. It has since been discovered that even better coatings can be obtained with further increases in the amount of epoxy added to the coating composition. The higher epoxy compositions allow the coating to flow more evenly over the wire surface when applied by dry electrostatic techniques and, is a valuable feature in transformer wire coating operations. These higher epoxy compositions permit the formulation of higher solids enamels which greatly reduce the solvent required.

The purpose of this invention therefore is to provide three component wire coating composition having a high concentration of epoxy resin.

SUMMARY OF THE INVENTION

Improved transformer wire insulating compositions are disclosed having increased amounts of epoxy resin. The increased epoxy constituent substantially improves the coating flow properties and provides for wider variations in the coating application process. Proportionately decreasing the phenolic and polyvinyl acetal resins allows for the increased epoxy constituent without affecting the coating electrical properties.

BRIEF DESCRIPTION OF THE DRAWINGS

FIG. 1 is a cross sectional view of a transformer wire coated with an enamel composition according to the invention;

FIG. 2 is a triaxial diagram of some state of the art wire coating compositions;

GENERAL DESCRIPTION OF THE INVENTION

Figure 3:
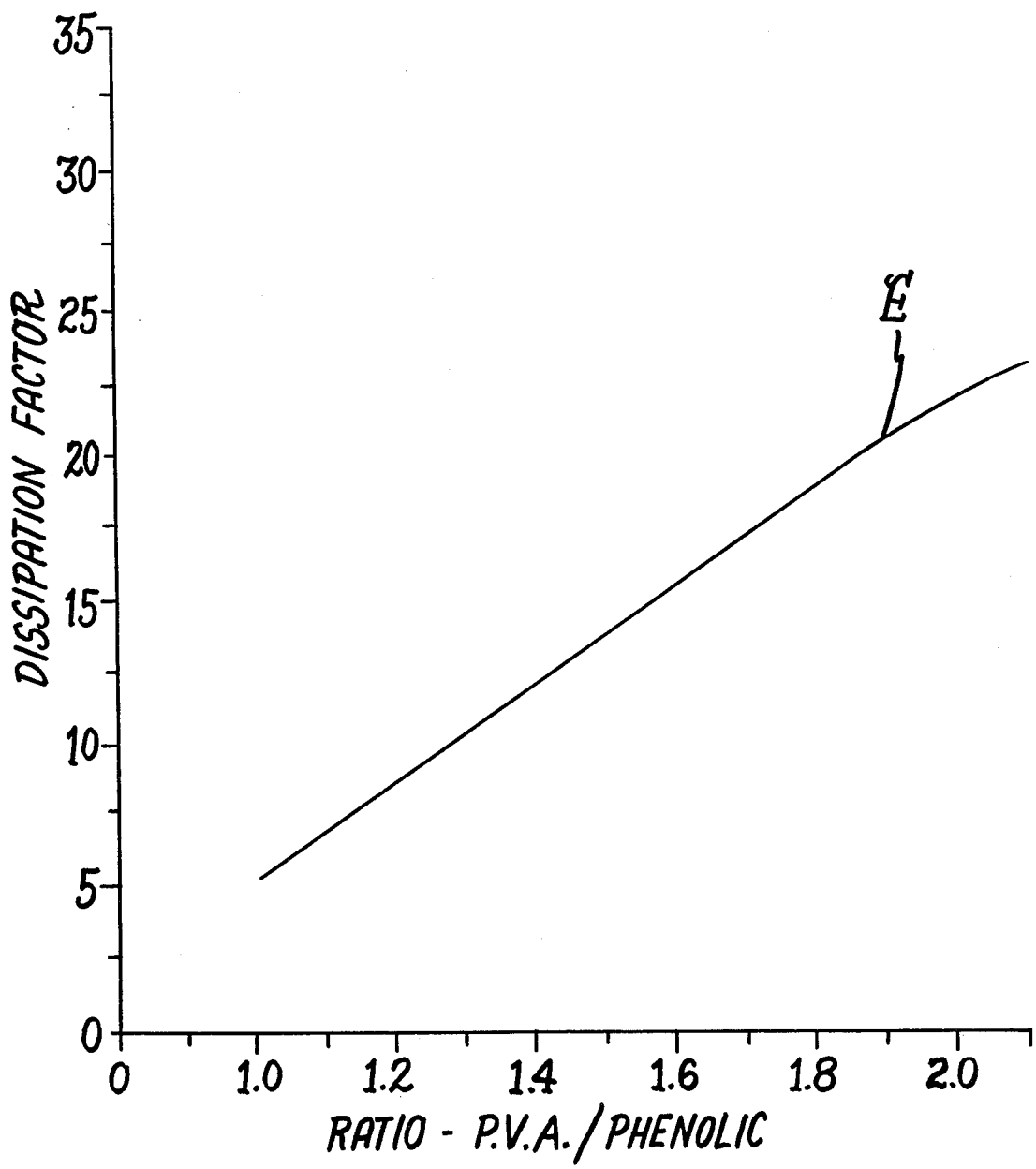
FIG. 3 is a graphic representation of the relationship between dissipation factor and PVA to phenolic ratio for constant epoxy concentrations.

The aforementioned U.S. Patent application discloses the combination of the reaction product of a mixture of polyvinyl acetal resin, phenol aldehyde resin and epoxy resin in a particular range of proportions for electrically insulating coatings for transformer wires. Transformer wire coatings to be subjected to the high temperatures and moisture conditions existing within a transformer enclosure must have a low dissipation factor, good flexibility and be hydrolytically stable for the reasons discussed earlier. The aforementioned U.S. Patent application limited the ranges of the three constituents to ensure that no problem in flexibility, dissipation factor or hydrolytic stability would occur. The phenol aldehyde resin was kept at less than 40% in order not to reduce the flexibility and at least 20% in order to avoid an excessively high dissipation factor. The polyvinyl acetal resin was kept at less than 65% in order not to create an excessively high dissipation factor while at least 40 percent was required to provide satisfactory flexibility. The epoxy concentration was kept at less than 30 percent to avoid both high dissipation factor problems as well as hydrolytic instability. Seven percent of the epoxy was required however to promote adequate fusion of the powder particles and to impart uniformity to the coating. Since the epoxy constituent is an extremely beneficial contributor to the amount of solids remaining on the wire, after the fusion process, attempts to increase the epoxy content above 30 percent were heretofore infeasible because of the high dissipation factor and hydrolytic instability inherent within the epoxy material.

Since the aforementioned three component wire coating composition is applied to transformer wire, by a wet die process, as well as by a dry electrostatic coating process, tests were undertaken to determine the theoretical maximum solids content of coating material that can be operably applied by both methods to transformer wire. The wet die technique was chosen as the test method of application for purposes of convenience in applying to the wire. After dissolving samples containing increasing amounts of epoxy resin, plastic films were case from the samples. Hydrolytic stability and dissipation factor measurements were also taken in order to determine whether increases in the amount of epoxy within the coating could be tolerated without seriously interfering with the electrical characteristics. Using the resins and solvents disclosed within the aforementioned U.S. Patent application it was then discovered that for very high epoxy coatings containing approximately the same amount of phenolic resin as described within the teachings of the aforementioned U.S. Patent application and substantially less polyvinyl acetal resin, strong, flexible and hydrolytically stable coatings resulted having satisfactory low dissipation factors.

FIG. 1 shows the insulation coating 2 on the transformer wire 1 containing ingredients described within the aforementioned U.S. Patent Application in amounts ranging from low to high epoxy resin content.

FIG. 2 shows the preferred range of compositions B as disclosed therein along with the operational range A. It is to be noted that high concentrations of polyvinyl acetal increases the dissipation factor to an excessive and inoperable value as indicated and that high concentrations of phenol aldehyde produce coatings having poor flexibility. The high ranges of epoxy are known to produce problems with hydrolytic stability. The compositional range disclosed within the aforementioned U.S. re-issue patent is shown at C and can be seen to encompass high dissipation problems at the high polyvinyl acetal end of the range and problems with hydrolytic stability at the high epoxy end. The composition disclosed within the aforementioned U.S. patent is shown at D to exhibit poor flexibility when evaluated as a wire coating material.

DESCRIPTION OF THE PREFERRED EMBODIMENT

For the increasing epoxy compositions described earlier and evaluated for dissipation factor, hydrolytic stability, and flexibility, it was discovered that the dissipation factor increased with increasing ratios of polyvinyl acetal to phenolic as well as increasing amounts of epoxy resin. When the epoxy content was kept constant and the amount of polyvinyl acetal was increased relative to the phenolic resin the dissipation factor also increased in proportion to the polyvinyl acetal to phenolic ratio. The relationship between dissipation factor and polyvinyl acetal to phenolic ratio (P.V.A./phenolic) is shown at E in FIG. 3. Since the low ratio values exhibited low dissipation for the same epoxy content of 35 percent, an attempt was made to increase the epoxy content in excess of 35% to determine whether low dissipation could be realized within the same range of ratios. In order to determine operability as an insulating coating the increased epoxy resins were also evaluated for flexibility and hydrolytic stability using standard techniques. The samples which showed good hydrolytic stability and good flexibility as well as a dissipation factor of less than 25 percent at 170° C. were considered to pass the evaluation. Coatings having dissipation factors in excess of 25 percent at 170° C. and/or having poor electrolytic stability and poor flexibility failed the evaluation.

Figure 4:
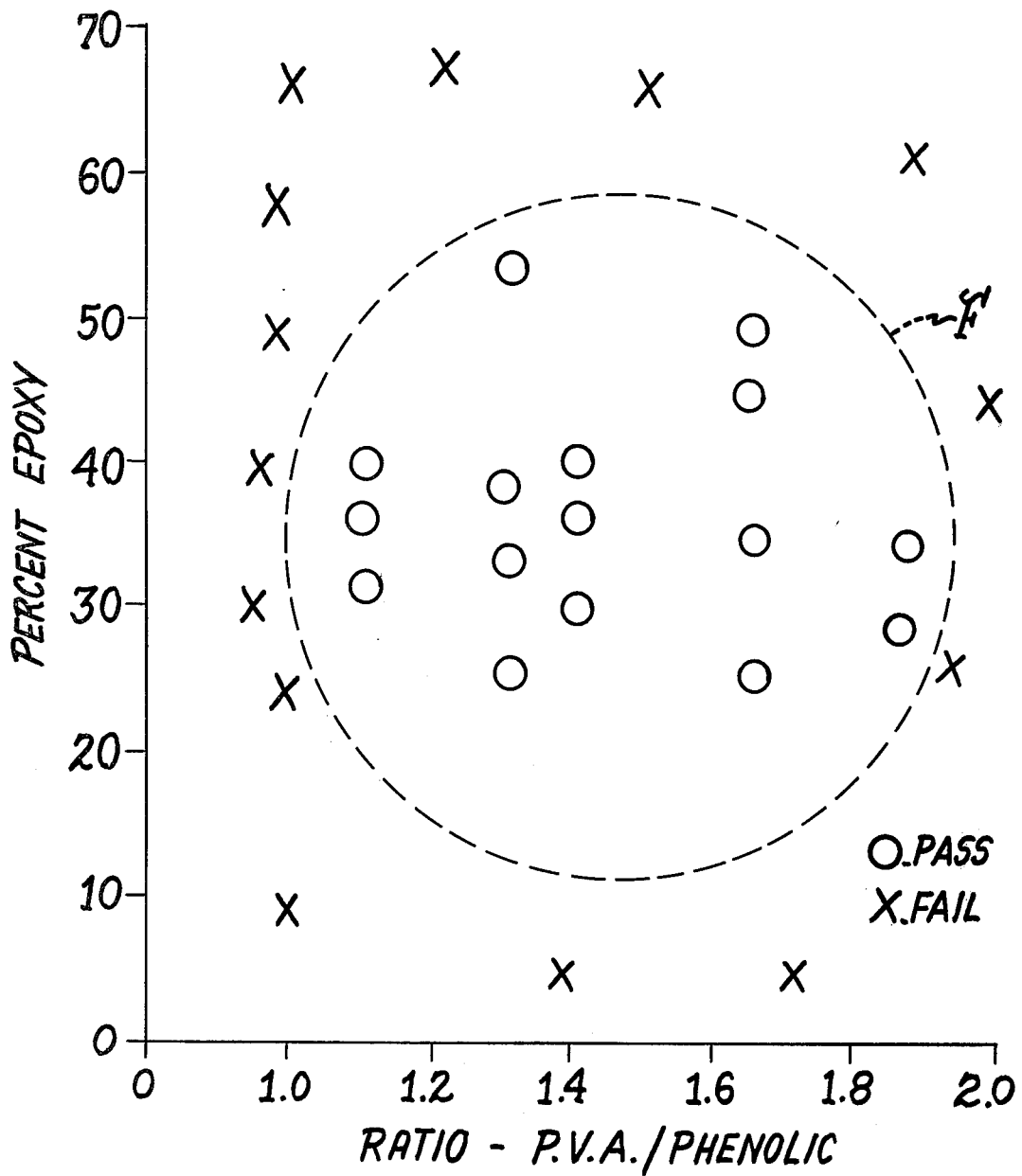
FIG. 4 is a graphic representation of the relationship between the ratio of PVA to phenolic for operable concentrations of epoxy resin.

The results of the large series of evaluations for increasing epoxy mixes within the ratio of P.V.A. to phenolic range of 1.0 to 2.0 is shown in FIG. 4.

The samples which failed any of the aforementioned parameters are indicated by crosses and the samples which passed all the parameters are indicated by circles to show the effective range of both the epoxy content and the P.V.A. to phenolic ratios. An approximate compositional range of epoxy mixes is designated at F where the epoxy content varies from as low as 10 percent to as high as 60 percent within a range in P.V.A. to phenolic ratios of from 1.10 to 1.90. It is to be noted that both low and high epoxy compositions failed within the range of ratios and that low and high ratios failed for the same epoxy compositions.

Figure 5:
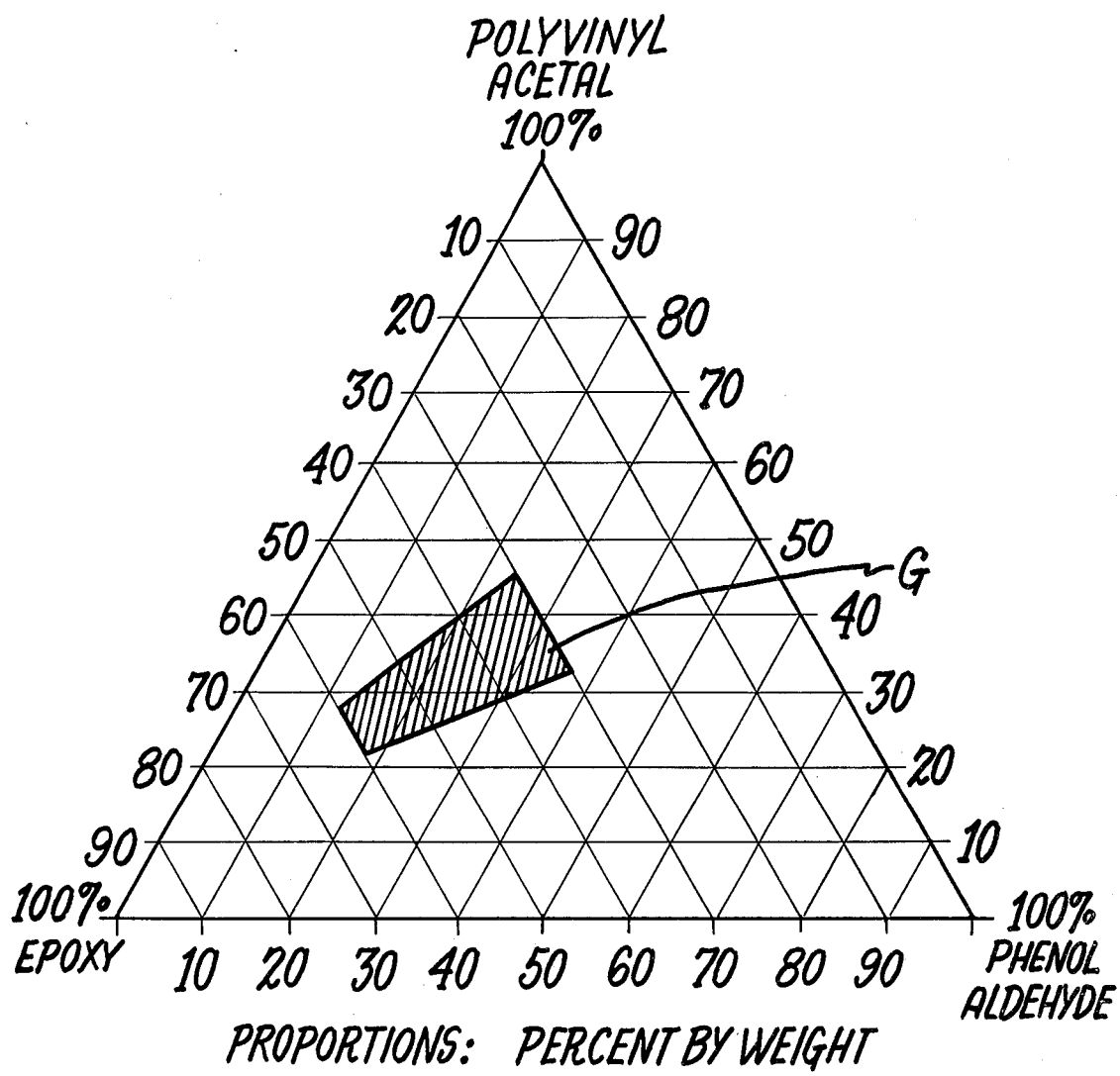
FIG. 5 is a triaxial diagram of the improved coating composition of the invention.

FIG. 5 shows the effective compositional range G for concentrations of epoxy, phenol aldehyde and polyvinyl acetal as measured in weight percent for the samples from FIG. 4 that possessed the necessary requirements for operable insulating wire coatings. The increase in the overall amounts of the epoxy constituent expands the manufacturing tolerances for the process of preparing and applying the coating composition and greatly improves over the low epoxy composition shown earlier in FIG. 2. The increased epoxy content should exhibit anticipated problems in hydrolytic stability since the ranges now indicated at G in FIG. 5 extend within the area of the diagram within FIG. 2 where hydrolytic instability occurs.

The improved compositions within the region designated as F having the configuration of an inverted truncated cone, however, do not exhibit poor flexibility, hydrolytic instability or high dissipation as anticipated from the teachings of the prior art. Since the improved compositional range now comprises: Polyvinyl acetal 20–46% by weight; phenolic resin 14–34% by weight; and epoxy resin 30–60% by weight, insufficient polyvinyl acetal should therefore result in wire coatings having poor flexibility as indicated in FIG. 2. The excellent hydrolytic stability and low dissipation factor for the high epoxy-low polyvinyl to acetal composition implies a coaction between the epoxy resin and the polyvinyl acetal resin since the phenolic resin composition remains relatively unchanged. Since the epoxy material is hydrolytically unstable per se it is surprising, therefore, that by decreasing the particular component of the composition that improves the necessary property of hydrolitic stability (polyvinyl acetal) and increasing the component which has high inherent dissipation (epoxy) can result in a wire coating possessing superior electrical insulating properties.

Compositions were prepared using the resin materials described within the forementioned U.S. patent application but having the improved ranges shown in FIG. 5 and were applied to transformer wires by a wet floating die process in one case and by a dry electrostatic process in another. In both methods of application the resulting coatings exhibited dissipation factors less than 25 percent at 170° C. with good continuous and flexible coatings that were also hydrolytically stable. In the solvent application system, the solvent represented approximately 60 percent by weight of the total solution whereas the composition applied by entraining the dry powder in a fluidized bed gas stream and applying a high voltage electrostatic DC field between the powder and the transformer wire equally adhered without any solvents at all. The wire was heated to a first temperature to fuse the coating and then to a second higher temperature to cause the resins to react.

Besides providing good rheological flow properties to the coating by decreasing the polyvinyl acetal and increasing the epoxy resin content impressive costs savings can also be realized since the polyvinyl acetal is the most expensive ingredient in the composition. Combining the compositional range of the prior art with that of the improved coating formulation provides a large range of manufacturing latitude and greatly improves the overall transformer manufacturing efficiency. Extending the range from 20 to 65 parts by weight polyvinyl acetal; 14 to 40 percent by weight phenol aldehyde resin; and 7 to 60 weight percent epoxy resin greatly expands the overall manufacturing tolerances. In the transformer wire coating field the range in materials composition determine the manufacturing "window". It can be readily understood, therefore, the wider the range of materials used in preparing the wire coating composition the larger the manufacturing window and, ultimately, the lower the manufacturing costs.

Although the improved wire enamel composition of the invention is disclosed for use within power transformers this is by way of example only. The improved wire coating composition of the invention and the methods of application thereof find application wherever electrically insulating wire coatings may be required having good flexibility, low dissipation and good hydrolitic stability.

What is claimed is:

1. An improved insulating coated transformer wire of the type consisting of a wire having an insulating coating of phenol aldehyde resin, polyvinyl acetal resin and epoxy resin wherein the improvement comprises the composition defined within the accompanying triaxial diagram of FIG. 5.

2. A method for coating transformer wire with an insulating coating comprising the steps of:
preparing a composition consisting of 30 to 60 weight percent epoxy resin, and a ratio of from 1.10 to 1.90 polyvinyl acetal resin to phenol aldehyde resin;
applying the composition to the transformer wire; and
heating the coated transformer wire to a first temperature to fuse the coating; and
heating the coated wire to a second temperature to cause the coating to react.

3. The method of claim 2 wherein the step of applying the composition to the wire comprises passing the wire through a coating die.

4. The method of claim 2 wherein the step of applying the composition to the wire comprises electrostatic coating.

5. The method of claim 2 wherein the second temperature is higher than the first temperature.

* * * * *